United States Patent
Fushiki et al.

(10) Patent No.: US 6,803,913 B1
(45) Date of Patent: Oct. 12, 2004

(54) WARPING TEXT ALONG A CURVED PATH

(75) Inventors: Ikko Fushiki, Redmond, WA (US);
Hock San Lee, Redmond, WA (US);
David Brown, Redmond, WA (US);
Bodin Dresevic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/452,422

(22) Filed: Dec. 1, 1999

(51) Int. Cl.[7] .............................. G06T 11/00; G09G 5/28
(52) U.S. Cl. ....................................... 345/467; 345/648
(58) Field of Search ................................. 345/467–470, 345/646, 647, 648

(56) References Cited

U.S. PATENT DOCUMENTS

| | | | |
|---|---|---|---|
| 5,416,898 A | * | 5/1995 | Opstad et al. .............. 345/468 |
| 5,724,072 A | * | 3/1998 | Freeman et al. |
| 5,920,327 A | | 7/1999 | Seidensticker |

OTHER PUBLICATIONS

"GPOS—The Glyph Positioning Table", *Microsoft Developer's Network CD ROM*, Microsoft Corporation, Jul. 1999.
Moore, George, "An Introduction to Digital Typography Using TrueType", Apr. 2, 1992. Reprinted in *Microsoft Developer's Network CD ROM*, Microsoft Corporation, Jul. 1999.
"The Baseline Table", *Microsoft Developer's Network CD ROM*, Microsoft Corporation, Jul. 1999.
"True Type and Windows NT", *Microsoft Developer's Network CD ROM*, Microsoft Corporation, Jul., 1999.
"The OpenType Font File", *Microsoft Developer's Network CD ROM*, Microsoft Corporation, Jul., 1999.
"DEGF—The Glyph Definition Table", *Microsoft Developer's Network CD ROM*, Micrsofot Corporation, Jul. 1999.
"About Windows NT Fonts", *Microsoft Developer's Network CD ROM*, Microsoft Corporation, Jul. 1999.
"Chapter 17: Text and Fonts (continued)", *Microsoft Developer's Network CD ROM*, Microsoft Corporation, Jul. 1999.
"Bezier Curves", *Microsoft Developer's Network CD ROM*, Microsoft Corporation, Jul. 1999.

* cited by examiner

*Primary Examiner*—Jeffrey Brier
(74) *Attorney, Agent, or Firm*—Leydig, Voit & Mayer, Ltd.

(57) ABSTRACT

A system and method is described for manipulating text relative to a curved reference line in order to transform a character, rendered in a particular font, to generate a warped character with the degree of warping reflecting the local curvature of the curved reference line. The curvature of the reference line is reflected in the nature of quadilaterals, i.e., quads, generated for a corresponding rectangle on a straight reference line. The coordinates of the corners of the quad provide the parameters to carry out the transformation. Such rendering improves the appearance of the text and provides a method that modifies available fonts in a flexible fashion without the need to generate new fonts.

7 Claims, 9 Drawing Sheets

WARPING TEXT ALONG A CURVED PATH

TECHNICAL FIELD

This invention relates generally to displaying art and information in a computing environment and, more particularly, relates to rendering text along a curving baseline.

BACKGROUND OF THE INVENTION

The natural sensitivity of humans to visual information and audio-visual cues makes graphical representation of information of central importance in facilitating the effective use of computers. The ever increasing speed of the modern processors and better algorithms for rendering graphical information have made possible visual interfaces such as that found in the "WINDOWS®" brand operating systems manufactured by "MICROSOFT®" corporation of Redmond, Wash.

In addition to developing user interfaces, this technology has also been used to create art, such as composing photographs, manipulating images, creating a virtual reality packed with, otherwise impossible, flights of fancy and the like. Moreover, the availability of affordable computing power has resulted in providing the average computer user with access to tools such as a variety of fonts for rendering text. Such capabilities, possible previously only with the aid of sophisticated typesetting skills, are now at the fingertips of an average child designing a greeting card on a computer. Underlying such achievements are techniques for efficiently manipulating graphical objects, including, typographic objects such as glyphs.

It is customary to regard typographic objects, such as those used for rendering text characters, as being somewhat different from ordinary graphical objects although they can be manipulated by similar methods. In part, the reasons have to do with the nature of transformations of text objects and the rules for their placement. Thus, in English the horizontal placement of characters (in reality it is glyphs corresponding to the desired characters that are placed) is varied to generate pleasing text, while in Arabic the glyphs are placed diagonally to each other in the same word. To add to this complexity there are rules for rendering cursive characters placed next to each other and rules for combining characters or using different shapes in different contexts requiring the use of particular glyphs. Since output devices usually handle digital data as pixels, which also characterize the resolution of the device, the glyphs are stepping stones for generating a collection of pixels to yield a bitmap.

In the "TRUE TYPE®" font specification, commonly used in the "WINDOWS®" brand operating systems manufactured by "MICROSOFT®" corporation of Redmond, Wash., a particular glyph is specified by a set of curves connecting a set of points, although bitmaps may be embedded as well. These curves defining the outline of the character may be advantageously specified by suitable polynomial or other expressions.

More precisely, a series of points connected by curves and lines is specified to define a character, as rendered in a particular glyph. Furthermore, "TRUE TYPE®" fonts include "hints," which are instructions for distorting the curves within a glyph-rectangle, which can be attached to the font.

When a user desires to graphically render a particular character, a corresponding glyph is identified taking into account the preceding and following character, language, style and the physical placement relative to vertical and/or horizontal references. Text strings are conveniently displayed by placing several such glyph-rectangles, usually side by side, along a reference line. The choice of a particular glyph is made by the use of a suitable set of lookup tables that provide the corrections necessary to give effect to different justification choices, fonts, hints and the like to generate many shapes from a starting template.

The notable feature in the scheme described above is that the font specifications and character manipulation rules are largely independent of the display device. The resolution at which curves are described in a glyph significantly exceeds the resolution of the best output devices available today. Thus, errors due to digitization of the outline in a particular glyph are not perceptible to ordinary observers and the outline may be described by equations that are converted into specific bits or points only when required to reduce potential loss of resolution. It should be noted that the description should not be interpreted to limit the disclosure to "TRUE TYPE®" technology. Other outline technologies are suitable for practicing the invention. Some additional examples of such technologies are "POSTSCRIPT®" and vector fonts.

Two-dimensional graphical objects are customarily transformed using affine transformations, such as scaling, rotating, skewing, and translating, which transform parallel lines into parallel lines. In addition, non-affine transformations such as bilinear and perspective transforms are available. In a bilinear transform, as an example of a non-affine transform, a rectangle is transformed into a "quad," i.e., a quadrilateral, such that any point along the edge of the rectangle becomes a point on the edge of the quad while retaining its relative position. A rectangle, itself, is a quad with the restriction that its opposite sides are parallel. This condition is relaxed for quads in general. In a perspective transform a two-dimensional image, treated as a projection of a three-dimensional object, is transformed to generate another projection. These transformations are discussed in the pending patent application "Method and Apparatus for Transforming and Rendering Graphical Curves," Ser. No. 09/452,658, filed on Dec. 1, 1999, which is incorporated by reference in its entirety in this application.

Typically, a straight reference line is used to predictably manage text strings. It is difficult to integrate editable text with typical glyphs placed along an arbitrarily curved reference line because in the presence of significant curvature of the reference line text is distorted in a manner that is less than pleasing. The context defined by the local curvature of the baseline is not reflected in the rendering of the characters contained in the text. Thus, the range and nature of transformations available for rendering text along curved baselines are in need of rules for adjusting the glyphs to account for the curvature in the baseline. The difficulty in satisfactorily obtaining such rules is made apparent by considering that a rather large number of glyph combinations are possible for arbitrarily curved reference lines, thus reducing the utility of lookup tables or other techniques for fast rendering of text strings on a curved reference line.

It should be noted that transformations of text along a straight reference line to yield a curved reference line with text might result by transformations other than those manipulating fonts directly. As an example, the U.S. Pat. No. 5,920,327 issued to Robert Seidensticker, Jr., describes rendering graphical objects at different resolutions within the same image to generate a 'fish-eye' view with apparently curved baselines when the graphic includes text strings. It does not, however, teach specifying an arbitrary curvature for the baseline or other reference lines or adjusting the curvature or font in course of rendering the text string.

SUMMARY OF THE INVENTION

The invention describes a method and system for rendering text along an arbitrarily curved reference line by transforming the text to reflect the curvature of the reference line. Thus the overall effect of the curved text is more pleasing as the individual characters are transformed in a manner closely following the local curvature of the reference line. An embodiment teaches positioning and orienting the glyphs corresponding to the text string to take into account the curvature of the reference line. In addition, optional "warping" of the individual glyphs is possible to present a pleasing appearance.

The transformation from a rectangle to a corresponding "quad" results in a warping of the character in accordance with a specified transformation. The local curvature is used to deduce a suitable number of "quads" on the curved reference line corresponding to the rectangles on a straight reference line within which defined portions of text characters, termed glyphs, are rendered in a manner specified by a font. The font specification is typically in the form of a collection of curves describing the outlines of a glyph. Thus, a transformation is provided from a straight reference line to a curved reference line, such that text rendered relative to the straight reference line is transformed into text relative to the curved reference line by also transforming the curves defining the outlines of the individual glyphs to yield warped text.

Suitable transformations include bilinear and perspective transforms of a curve. In many embodiments a preferred transformation is the bilinear transformation, which, in contrast to the perspective transformation, results in a more even rendering of the characters and, in particular, alignment of the medians of adjacent characters. An exemplary procedure is described for calculation of the bilinear transformation of a linear curve and of a cubic polynomial curve. In particular, a linear curve is transformed into a quadratic curve, and a cubic polynomial, which may be a Bezier curve, is transformed into a sixth-order polynomial curve. Furthermore, these transformations are advantageously performed by suitable non-linear transforms described below as well as in the pending patent application "Method and Apparatus for Transforming and Rendering Graphical Curves," referenced above.

In other words, the invention teaches a system and method in which the curvature of the baseline can be used to calculate one or more quads corresponding to the glyph-rectangles used as a reference for the curves defining a particular glyph. The coordinates of a quad allow a convenient transformation of the curves defining the glyph outline in the corresponding glyph-rectangle. Thus, glyphs are conveniently transformed from a straight reference line context into a form suitable for a curved reference line and in a manner sensitive to the local curvature of the curved reference line, resulting in an aesthetically pleasing rendering of text strings without the need to define additional fonts or glyphs. These transformations can be made by implementing suitable Application Programming Interfaces (APIs) for the benefit of programmers and interested users.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
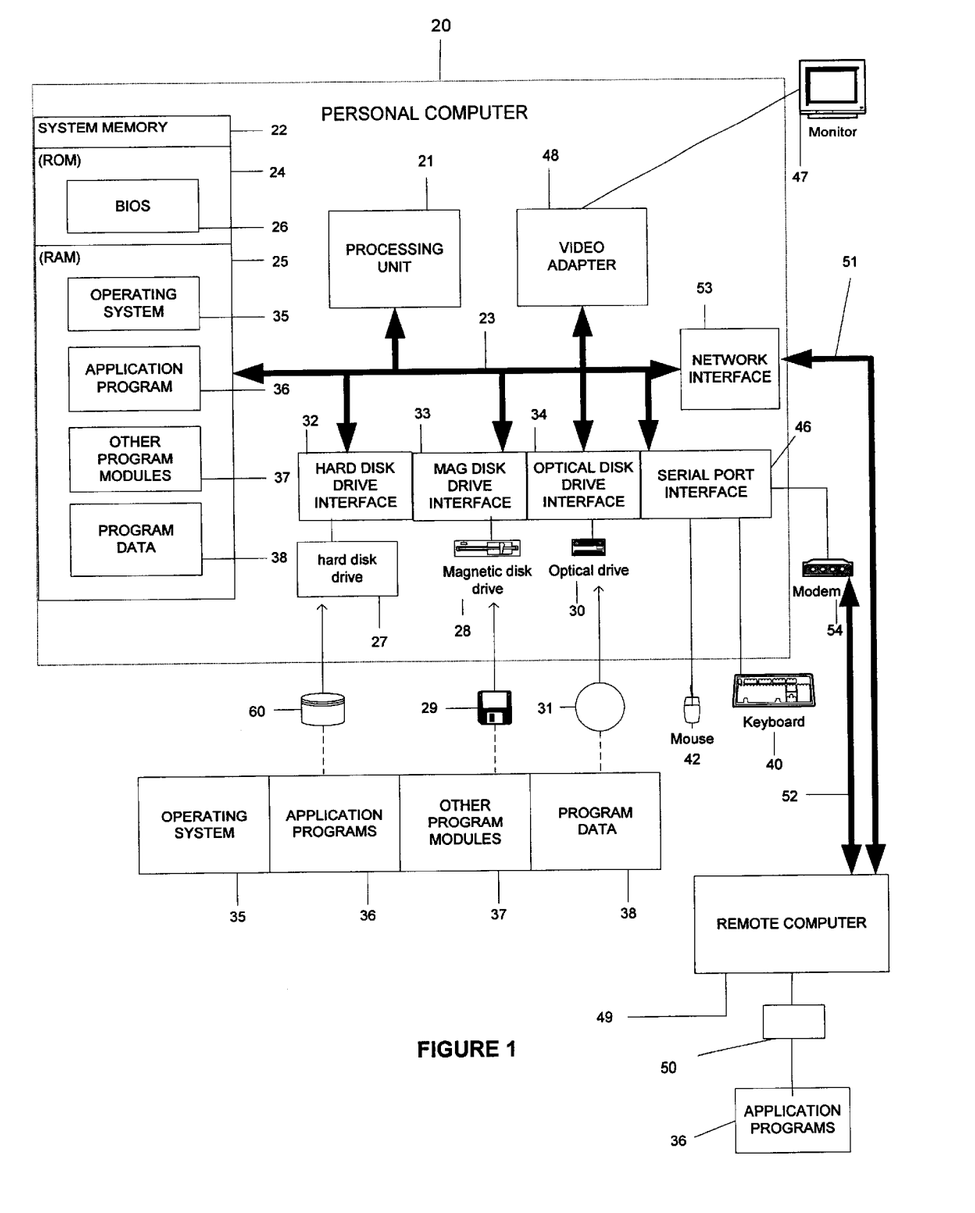
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In light of the background, a glyph may be understood to be a set of curves, typically cubic polynomials or Bezier curves, rendered relative to a glyph-rectangle, at least as implemented in most font collections, to define the outline of a character. The Bezier form of specifying a curve uses four points to define the beginning of the curve, the end of the curve, and two control points that define tangents to the curve at the two ends of the curve. The Bezier curve control points usually do not lie on the curve. Thus, the glyph outlines are conveniently regarded as a collection of Bezier curves and straight line segments joining a specified set of points. This description is accurate even if polynomials of degree greater than three are employed since higher order Bezier curves may be used to describe the glyph outlines.

Figure 2:
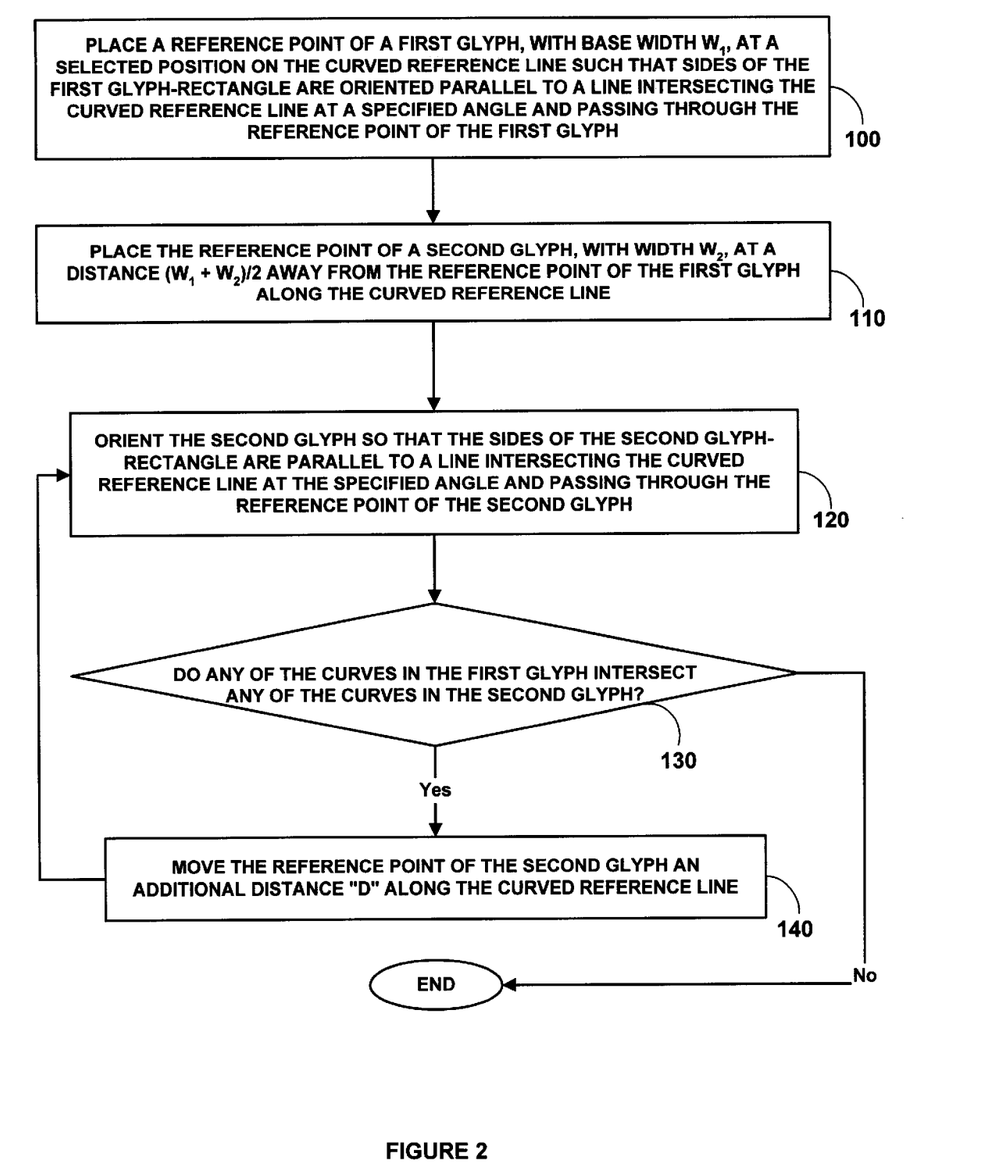
FIG. 2 is a flow chart illustrating a procedure for positioning and orienting text on a curved reference line.

In accordance with the invention, FIG. 2 illustrates an embodiment for placing text on a curved reference line. A glyph corresponding to a character is placed on a reference line such that the midpoint of the glyph-rectangle is on the reference line (step 100). It should be understood that the reference line could have glyphs placed so that the bottom or top of each of the glyph-rectangles, or some other landmark in each of the glyph-rectangles is aligned with the reference line. In some embodiments, a convenient landmark in a glyph-rectangle may be the mid-point on the base of the glyph-rectangle defining the glyph.

The orientation of the glyph-rectangle is determined by orienting it at a specified angle to the reference line. This can be accomplished by orienting the glyph-rectangle, which has two sides, a top and a bottom, such that any of its two sides is parallel to a line passing through the reference line at the reference point of the glyph and at the specified angle. A convenient specified angle is a right angle. As is known to those of ordinary skill in the art, angles relative to the reference line are actually measured relative to a tangent to the reference line at the reference point. Without any loss of generality, in some embodiments angles may also be measured relative to an acceptable straight-line approximation to the curved reference line at that point.

Following the placement of the first glyph-rectangle, a second glyph-rectangle is placed adjacent to the first glyph-rectangle such that its midpoint lies on the reference line a distance $(W_1+W_2)/2$ away from the midpoint of the first glyph-rectangle, where $W_1$ and $W_2$ are the respective widths of the two glyph-rectangles (step 110) and in some embodiments include the spacing required to maintain a specified justification. The second glyph-rectangle is oriented in a manner similar to the orienting of the first glyph-rectangle (step 120).

The relative placement of the two glyph-rectangles is checked to detect if the curves in the two glyph-rectangles are intersecting, i.e., if there is overlap. For curves specified by Bezier curves this is relatively simple since the control points for each curve form a convex envelope defined by straight lines connecting the control points containing the curve. Thus, if the respective convex envelopes do not intersect, or if the lines defining the convex envelopes do not cross each other, then the curves cannot intersect. Alternatively, in other embodiments edges of adjacent quads, represented as straight lines, can be tested to see if they cross each other. This is a weaker condition since the enclosed glyphs may not intersect. Such tests are performed at step 130.

Overlapping glyphs are not necessarily objected to in all embodiments. In some embodiments if there is an intersection between the two glyph-rectangles, then the second glyph-rectangle is moved an additional distance "D" away from its previous position (step 140), and control is transferred to step 120. The required distance may be determined by the extent of the intersection or even by an iterative procedure. A possible iterative procedure may implement a large step, e.g., "D"=the width of the second glyph, away from the first glyph, followed by yet another step if the two glyphs still intersect. In the case where the intersection is no longer detected, a smaller step, e.g., "D"=⅓ of the previous value of "D," towards the first glyph is tried. This is repeated until the ever smaller steps generated when changing directions are below a prescribed step threshold. Several such iterative algorithms are possible with variations such as a prescribed "D" or using a projection from the intersecting lines used to detect the intersection between the adjacent glyphs as the starting value for "D" and the like. When there is no overlap, the procedure ends.

In another embodiment of the invention, the glyph-rectangle is transformed into a quad so that the transformed glyph rendered relative to a curved reference line is expressed by curves with equations modified to reflect the rectangle to quad transformation. Thus, in addition to positioning and orienting the glyph-rectangle the glyph-outline is "warped" in accordance with the local curvature.

In an exemplary method, a quad is determined by drawing a perpendicular to a reference line at a point corresponding to an end of a glyph-rectangle positioned on the reference line. For instance, if the reference line is a baseline then the base of a glyph-rectangle is placed on the reference line and the two ends of the glyph-rectangle base are used to place perpendiculars. A distance corresponding to a height of the glyph-rectangle is measured along each of the perpendiculars to define the upper corners of the glyph-quad so defined. The shape of the glyph-quad deviates from a rectangle if the underlying reference line has significant curvature because its two sides need not be parallel. It should be noted that aligning the tops of the glyph-rectangles or aligning at a specified reference point instead of using the glyph-rectangle base is similarly possible with suitable adjustments as is known to one of ordinary skill in the art.

In addition, flatness conditions may be used advantageously to generate several glyph-quads, placed side by side, to better warp the glyph outline in a glyph-rectangle of interest, particularly in regions with significant curvature.

Figure 3:
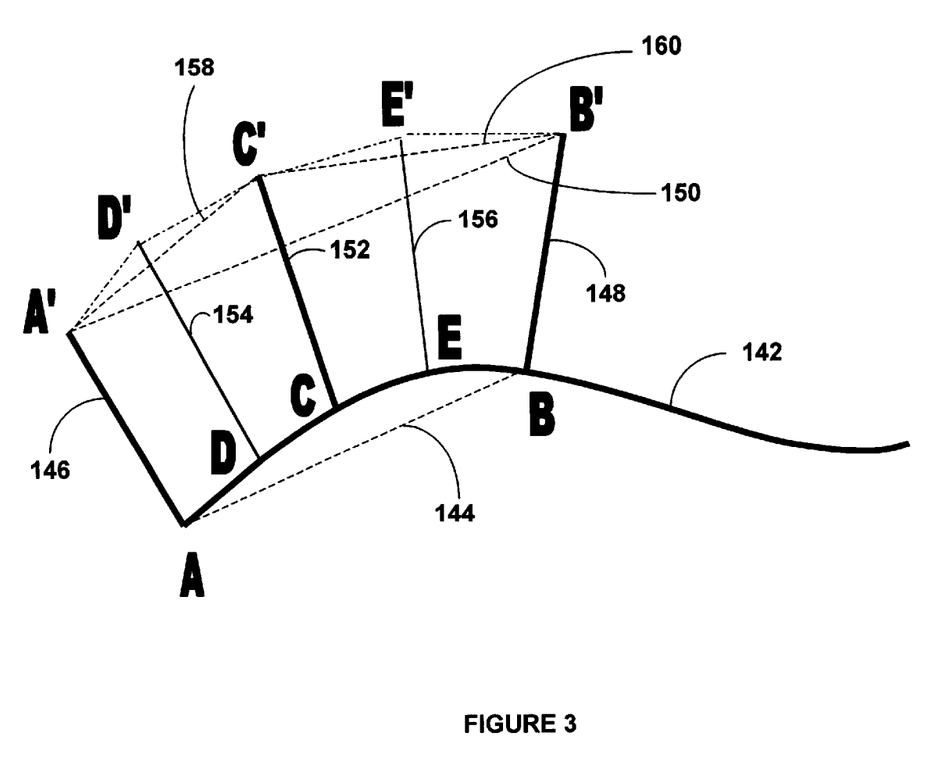
FIG. 3 is a diagram showing an exemplary construction in course of determining a number of desirable quads to render a glyph on a curved reference line.
Figure 9:
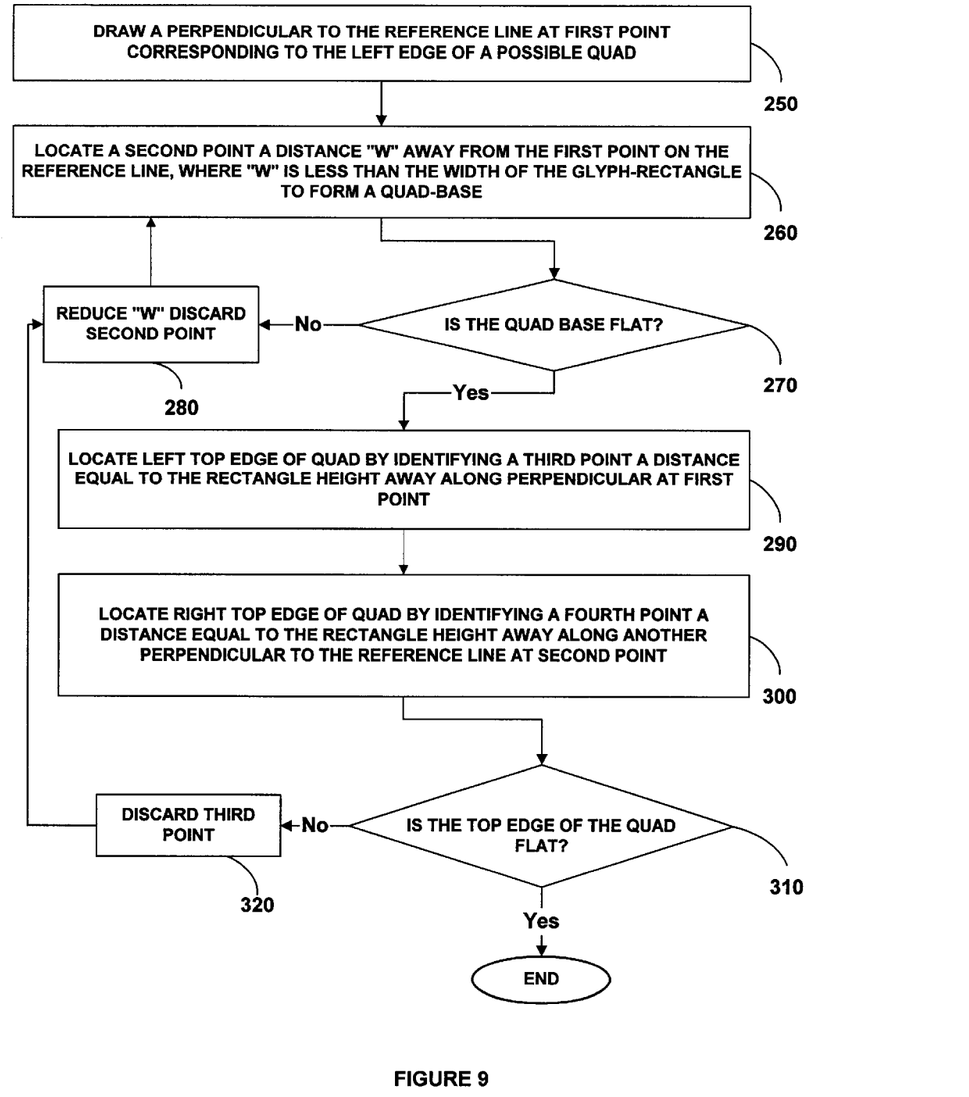
FIG. 9 is a flowchart for applying a flatness test in the course of determining suitable quads on a curved reference line.

FIG. 3 illustrates an exemplary set of constructs in the course of making such a mapping, and FIG. 9 outlines a series of steps in an exemplary method. The reference line 142 includes a segment ADCEB that is sufficiently flat compared to the straight line AB 144. The criteria for deciding if a particular segment is flat include, e.g., length of the segment between two points exceeding the length of a straight line connecting the same two points by no more than a set tolerance, or the maximum deviation of the segment from the straight line being within some set threshold, and the like. The segment AB corresponds to the base of a glyph-rectangle on a straight baseline. To obtain the corners of the glyph-quad a line of length equal to the height of the glyph-rectangle is drawn at point A perpendicular to the curved reference line 142 to generate side AA' 146. Similarly, another perpendicular line at point B defines side 148 and all of the corners of the quad AA'B'B. This quad would be acceptable if the top A'B' 150 satisfies a flatness condition, which may be similar to the flatness condition for segment AB of the reference line 142.

A possible flatness condition is obtained by bisecting the segment AB at point C on the reference line 142 and constructing a side, CC' 152, of length equal to AA' 146. If the distance between point C' and line A'B' exceeds a threshold then the flatness condition is not met and the quad AA'B'B is divided to yield two quads, AA'C'C and CC'B'B. Again, the flatness condition is tested for the two quads respectively by constructing DD' 154 and EE' 156 by similar steps. The flatness of A'C' 158 and C'B' 160 is tested with the procedure repeated until the requisite granularity is achieved and all of the quads satisfy a flatness condition for the top segments. The treatment of the bottom segment and the top segments could be reversed and the labels "top" and "bottom" should not be interpreted to be limiting.

Turning to FIG. 9, the first perpendicular to the reference line at a first point defines a first side of the quad, the left side in this embodiment (step 250). The base of the quad is tentatively determined by locating a second point along the reference line a distance "W" away from the first point to tentatively identify a quad base (step 260). The quad base segment defined by the first and the second points along the reference line is tested for flatness (step 270). Any suitable flatness criterion will suffice. For artistic reasons, this step may be implemented by some users as a test for a minimal amount of curvature rather than a lack of curvature, thus ensuring that the base is selected to be slightly curved. However, such implementations, although included within the scope of the invention, are not expected to be common.

If the quad base is not sufficiently flat then control is passed to block 280 where the step size "W" is reduced and the second point determined again in step 260. On the other hand, if the flatness requirements are met then the top left point of the quad is determined by locating a third point a distance, corresponding to the rectangle height, away (step 290) along the perpendicular drawn at step 250. Similarly, the fourth corner of the quad is determined at step 300 by locating a fourth point at a distance, corresponding to the rectangle height, away along a perpendicular drawn at the second point to the reference line. The line connecting the third and the fourth points defines the top of the quad.

If the top of the quad is not acceptably flat, i.e., it does not satisfy a flatness condition, which may not be the same as the flatness condition at step 270, the procedure transfers control to step 280, "W" is reduced further, and the procedure continues with another determination of the second point at step 260.

A glyph-rectangle corresponding to several contiguous quads, as described above, is advantageously divided proportionally so that the glyph curves contained within are divided as well. Thus, without any loss of generality, a transformation of the curves contained in a rectangle to a corresponding quad completes the mapping of text from a straight reference line to a curved reference line.

Figure 4:
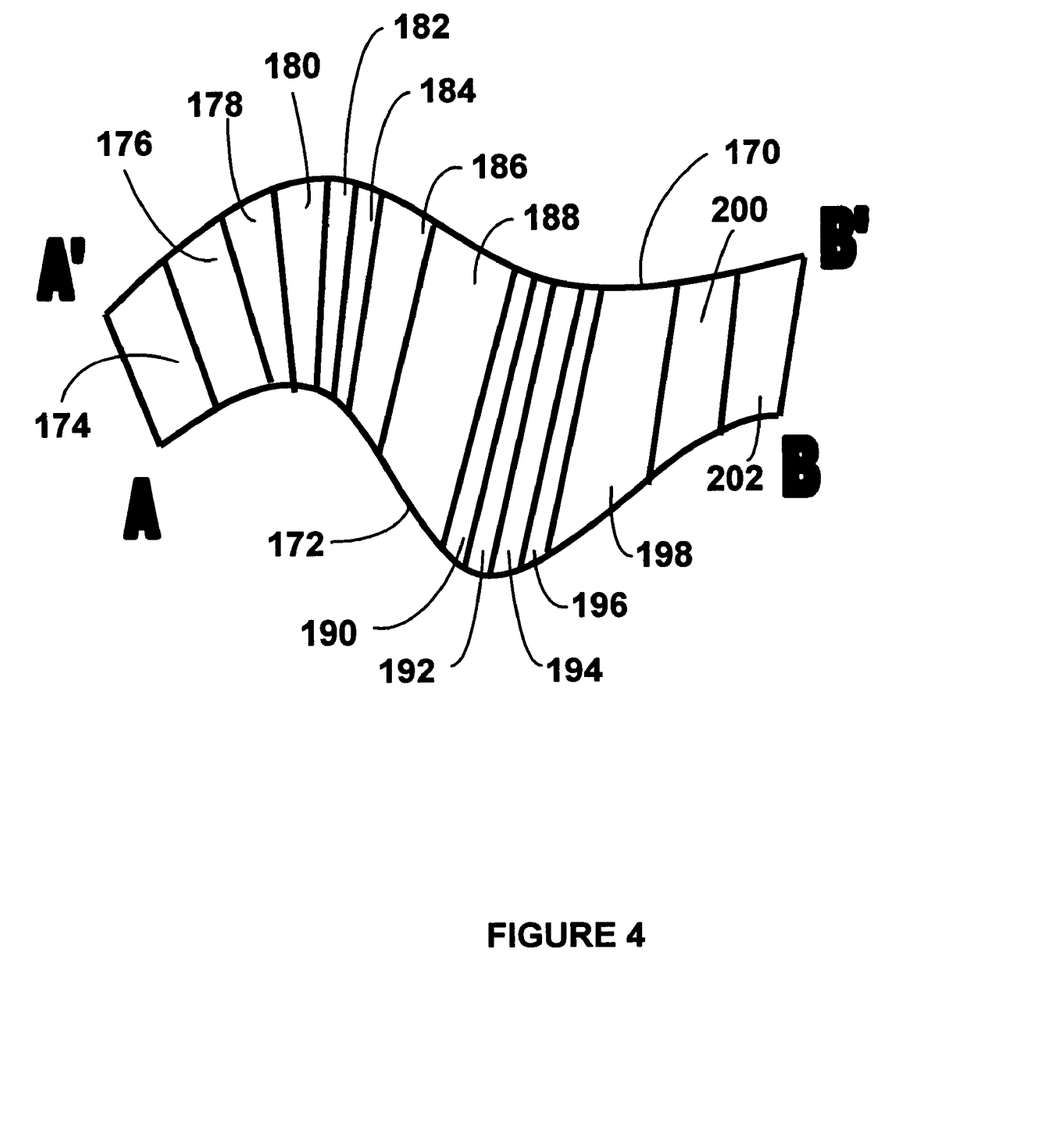
FIG. 4 is a diagram illustrating a possible set of quads determined with respect to two reference lines in accordance with the invention.

In another exemplary method for generating quads, two reference lines are specified. For instance, one reference line specifies alignment of the top of the glyph-rectangles while the other reference line specifies the alignment of the bottom of the glyph-rectangles. The quads are generated by dividing each of the reference lines proportionally to define the corners for the quads assuming a side by side placement of glyph-rectangles with a prescribed justification. Thus, if a text-string of 100 characters, corresponding to 100 glyph-rectangles, is to be placed according to the reference lines then each reference line is divided up proportionally. If the first glyph-rectangle has a base (and top) spanning two percent of a straight baseline then the first glyph-quad is formed by measuring two percent of the length of each of the reference lines to generate the corners of the glyph-quad. FIG. 4 illustrates the outcome of such a procedure for generating quads over the entire length of the reference lines. In FIG. 4, reference line 170, connecting ends A'to B', is shown above reference line 172, which connects ends A and B. Quads 174 to 202 are formed by a plurality of lines forming the sides of the quads while suitable segments of the reference line 170 provide the tops of each of the quads and the reference line 172, similarly provides the bottoms. As might be expected, there are more quads when the reference lines exhibit significant curvature. Thus, quads 174 and 176 are almost rectangular and generously spaced compared to the four quads178 to 184, which have a similar span in their combined base lengths. Additional variations such as the use of more than two reference lines to generate additional warping by generating stacked glyph-quads should be understood to be within the scope of the invention.

Figure 5A:
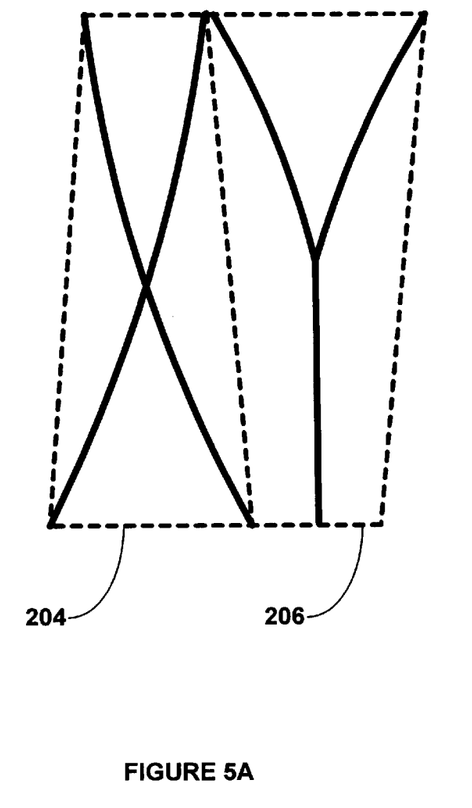
FIG. 5A illustrates a possible outcome of a bilinear transform.

Having generated a quad corresponding to a rectangle, the curves specified with respect to the rectangle are transformed into curves with respect to the quad. In an embodiment of the invention the bilinear transform is used to effect a transformation of curves described in a rectangle to curves described in the context of a corresponding quad. An example of the output of a bilinear transform of letters "X" and "Y" is shown in FIG. 5A. X and Y are enclosed by the quads 204 and 206, respectively. Typically, in parametric form, in a u, v coordinate system, curves may be described as:

$$u = f_u(t) \quad \text{EQ. 1}$$

$$v = f_v(t) \quad \text{EQ. 2}$$

Figure 6:
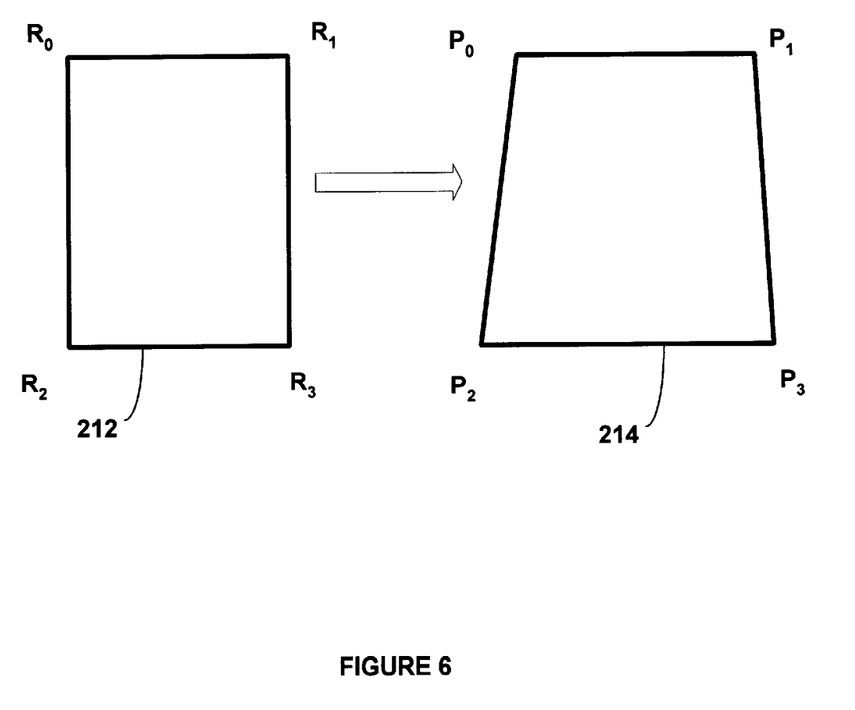
FIG. 6 illustrates a possible rectangle to quad mapping, showing the corners of the quad that provide parameters for warping.

Each coordinate x, y in the transform space is formed by combining Equations 1 and 2 using coordinate-specific transform functions of the form:

$$x = uv\alpha_x + u\beta_x + v\gamma_x + \delta_x \quad \text{EQ. 3}$$

$$y = uv\alpha_y + u\beta_y + v\gamma_y + \delta_y \quad \text{EQ. 4}$$

Where the constants $\alpha x$, $\beta x$, $\gamma x$, $\delta x$, $\alpha y$, $\beta y$, $\gamma y$, and $\delta y$, are determined from the corner points of a quadrilateral formed by transforming a base image square having corners at u, v coordinates of (0,0), (0,1), (1,0), and (1,1). FIG. 6 shows a rectangle 212 in u, v space defined by corners $R_0$, $R_1$, $R_2$, and $R_3$ and a corresponding quad 214, which is defined by corners $P_0$, $P_1$, $P_2$, and $P_3$. The coordinates of the quadrilateral 214 may be used to determine the constants in the Equations 3 and 4. The results are shown below:

$$\alpha_x = p_{0,x} - p_{1,x} - p_{2,x} + p_{3,x} \quad \text{EQ. 5}$$

$$\beta_x = -p_{0,x} + p_{1,x} \quad \text{EQ. 6}$$

$$\gamma_x = -p_{0,x} + p_{2,x} \quad \text{EQ. 7}$$

$$\delta_x = p_{0,x} \quad \text{EQ. 8}$$

$$\alpha_y = p_{0,y} - p_{1,y} - p_{2,y} + p_{3,y} \quad \text{EQ. 9}$$

$$\beta_y = -p_{0,y} + p_{1,y} \quad \text{EQ. 10}$$

$$\gamma_y = -p_{0,y} + p_{2,y} \quad \text{EQ. 11}$$

$$\delta_y = p_{0,y} \quad \text{EQ. 12}$$

where a subscript x designates the x coordinate of the point, and subscript y designates the y coordinate of the point. It should be noted that not all embodiments have coefficients described above, but rather the scope of the invention includes embodiments where coefficients in a transformation are generated by using at least one coordinate of the corners of a quad. The example discussed above is one such embodiment.

Using Equations 1 and 2 above, a line in the base image can be defined by parametric equations as:

$$u = tm_u + n_u \quad \text{EQ. 13}$$

$$v = tm_v + n_v \quad \text{EQ. 14}$$

where $n_u$, $n_v$ is the starting point of the line, and $m_u+n_u$, $m_v+n_v$ is the ending point of the line.

It is evident that substitution of Equations 13 and 14 in Equations 3 and 4 would yield parametric equations quadratic in the parameter 't.' Thus, equations linear in 't' are transformed into equations quadratic in 't' by the bilinear transform with the coefficients of the transformation determined by the coordinates of the corners of the quad. Similarly, cubic parametric equations are transformed into $6^{th}$-order equations by the bilinear transform, and an $n^{th}$-order equation is transformed into an equation of order 2n.

A bilinear transform ensures that if two curves, in different rectangles, join at a point on a common edge between the rectangles, they would be transformed into curves that are still joined even though the respective quads used in the transformation may be different for the two rectangles. This is an important consideration in embodiments where a glyph-rectangle is transformed to generate several quads, since connected parts of a glyph should continue to be connected after a transformation even if they fall in different rectangles. In addition, cursive writing may include joining of curves in different glyph-rectangles, which is ensured by the use of the bilinear transform. However, the bilinear transform does not ensure that the smoothness of the joint between the curves would be retained since the derivatives are not necessarily preserved in contrast with the relative positions of the curves on the edges of the quad.

Figure 5B:
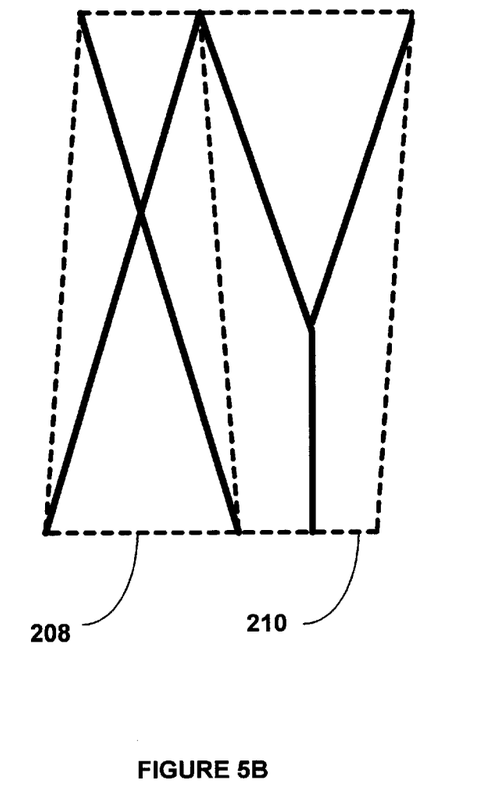
FIG. 5B illustrates a possible outcome of a perspective transform.

An alternative transform, the perspective transform, may be advantageously used in other embodiments of the invention. A perspective transform, unlike a bilinear transform, does not conserve the meeting points between curves in adjoining rectangles being respectively transformed into different quads. A perspective transform of "X" (contained in quad 208 in FIG. 5B) and "Y" (in quad 210) is shown in FIG. 5B and may be contrasted with the bilinear transform illustrated in figure 5A. However, curves subject to a perspective transform retain their degree of freedom because only linear transformations are involved.

Figure 7:
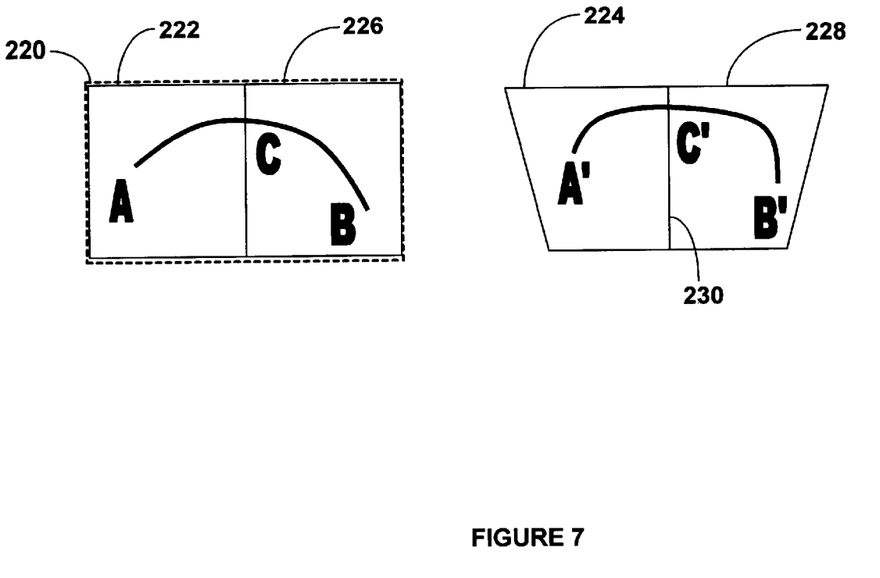
FIG. 7 illustrates splitting of a curve in a rectangle due to its being mapped to more than one quad.

FIG. 7 illustrates division of a curve in a glyph-rectangle into two curves falling in different glyph-rectangles. The curve AB corresponds to the glyph-rectangle 220. The glyph-rectangle is mapped to glyph-quads on a curved reference line resulting in a sub-rectangle 222 being mapped to quad 224 and sub-rectangle 226 mapping to quad 228. The curve AB is divided to yield curve AC in sub-rectangle 222 and curve CB in sub-rectangle 226. Corresponding curves in the quads are A'C' in quad 224 and C'B' in quad 228. Note that the use of the bilinear transformation results in ensuring that A'C' and C'B' actually meet at C' on the common boundary 230 between quads 224 End 228, although without conserving the slope at the join.

Figure 8:
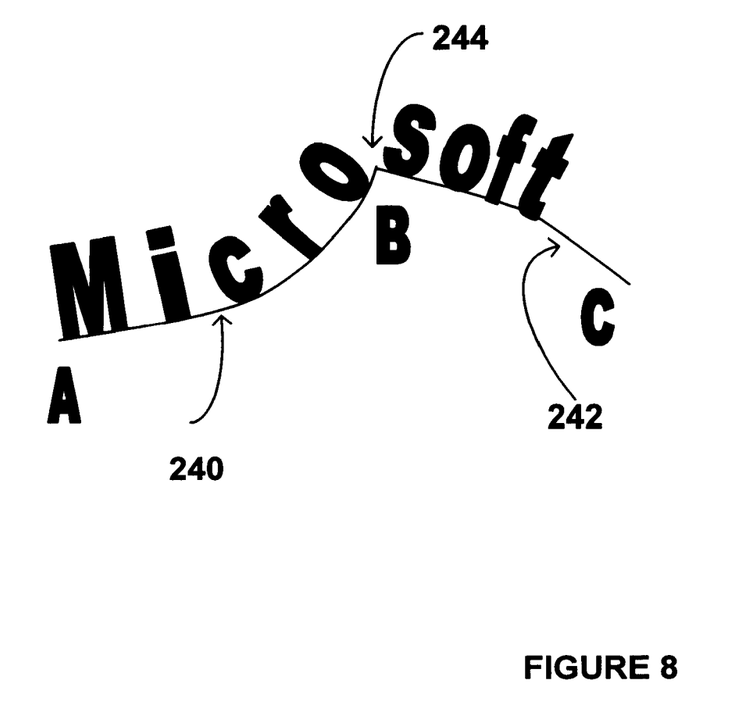
FIG. 8 illustrates a possible output of warped text on a curved reference line with a point discontinuity.

FIG. 8 illustrates a rendering of text along a curved reference line in accordance with the invention. The reference line comprises curve 240 joined to curve 242 at a non-smooth point 244. In general, there is no requirement that the curves are joined at non-smooth points, and this choice illustrates another feature intended to be within the scope of the invention. The text rendered along segment 240 is split from the text with reference to the segment 242 because in this embodiment no glyph-rectangles are positioned at points where a perpendicular to the reference line cannot be drawn. Since the mid-point of the glyph-rectangle/quad corresponding to the character "s" would have been at the non-smooth point, it is simply moved farther as illustrated.

It should be understood that the software manages reference lines not actually made visible in most embodiments. In some embodiments, the printed reference line may itself consist of text characters swirling around and providing a reference for yet more text characters. In general the invention may be practiced in a computing environment where a runtime is provided to enable execution of computer-executable modules. In such a system the invention allows the use of reference lines, which may be realized as visible or invisible reference lines, possibly created by executable modules, code for generating properly positioned glyphs relative to the reference line, and code for warping the glyphs so positioned. It is understood that positioning of glyphs relative to the reference line could be indirect or direct since it is a transitive operation. And, of course, warping the glyphs is intended to include warping smaller parts of the glyphs to produce warping of the entire glyph. As is customary in software, and is known to one of ordinary skill in the art, these functions may be packaged in several ways equivalent to providing modules to realize one or more reference lines, positioning of glyphs, and warping of glyphs so positioned.

In an embodiment of the invention, as implemented in the "WINDOWS®" operating system manufactured by the "MICROSOFT(&" corporation of Redmond, Washington, an API is provided for generating the curved baseline. Possible APIs are DrawString(String *s, Font *f, Brush *b, Path *p) or DrawString(String *s, Font *f, Brush *b, Path *p, REAL offset, Unit unit, PathDirection direction, TextFormat format). Since the path has the direction, text can be laid out in forward direction of the path or the backward direction of the path. In addition, a brush such as a texture brush or a gradient brush can be used to fill the inside of the text glyphs. DrawString( ) takes several format options, e.g., TA_TOP, TA_BASELINE, TA_BOTTOM, TA_LEFT, TA_CENTER, and TA_RIGHT. Instead of LEFT and RIGHT, we use START and END.

A version of DrawString( ) assumes the default values for offset, unit, direction, and format. The argument 'offset' indicates the offset of the starting point of the text. The path direction may be either forward or backward. The offset value is measured from the beginning of a path if the direction is forward and from the end of a path if the direction is backward. When we are moving along the path (either forward or backward), TOP and BOTTOM are interpreted to be the 9 o'clock and 3 o'clock directions, respectively. START marks the beginning of the path if the direction is forward and the end of the path if the direction is backward. TOP, BOTTOM, and BASELINE flags indicate that the text is to be aligned based on reference lines specifying its top, bottom, or baseline, respectively. START, END, and CENTER flags respectively indicate that the text is to be aligned at the START position or the END position of the path, or even centered in the middle position of the path.

In a possible embodiment the details of drawing multiple paths may be consigned to suitable APIs. In the case of two paths, APIs for the paths may be accessed as DrawString (String* s, Font* f, Brush* b, Path* lowerPath, Path* upperPath) or DrawString(String* s, Font* f, Brush* b, Path* lowerPath, Path* upperPath, Real startValue, Real endValue, TextFormat format). The paths, lowerPath and upperPath are guiding paths as shown in FIG. 4. The arguments startValue and endValue are floating point values chosen to be between 0 and 1 for convenience.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of rendering characters along a curved reference line, each of the characters comprising a glyph, the method comprising:

providing a first glyph with a width w1;

providing a second glyph with a width w2;

placing the first glyph adjacent to the second glyph on the curved reference line;

determining whether an overlap condition is exceeded between the first and second glyphs; and if the overlap condition is exceeded, then incrementally increasing a separation of the first and second glyphs and repeating the determining and incrementally increasing until the overlap condition is not exceeded;

wherein a midpoint of the second glyph is initially placed on the curved reference line a distance of (w1+w2)/2 from a midpoint of the first glyph.

2. The method of claim 1 wherein each of the glyphs is a rectangle.

3. The method of claim 1 wherein determining whether an overlap condition is exceeded comprises determining whether an envelope of the second glyph intersects a portion of an envelope of the first glyph.

4. The method of claim 1 further comprising orienting the first glyph so that a vertical axis of the first glyph is perpendicular to the curved reference line at a reference point of the first glyph.

5. The method of claim 1, further comprising orienting the second glyph so that a vertical axis of the second glyph is perpendicular to the curved reference line at a reference point of the second glyph.

6. The method of claim 1 wherein an incremental increase in the separation of the first and second glyphs is a fraction of the width of one of the glyphs.

7. A computer-readable medium containing computer-executable instructions for performing a method of rendering characters along a curved reference line, each of the characters comprising a glyph, the method comprising:

providing a first glyph with a width w1;

providing a second glyph with a width w2;

placing the first glyph adjacent to the second glyph on the curved reference line;

determining whether an overlap condition is exceeded between the first and second glyphs; and if the overlap condition is exceeded, then incrementally increasing a separation of the first and second glyphs and repeating the determining and incrementally increasing until the overlap condition is not exceeded;

wherein a midpoint of the second glyph is initially placed on the curved reference line a distance of (w1+w2)/2 from a midpoint of the first glyph.

\* \* \* \* \*